May 7, 1940.    F. L. OVERSON    2,199,728
SIGHT FEED CONTROL OF WATER SOFTENING TREATMENT FOR BOILERS
Filed May 18, 1938
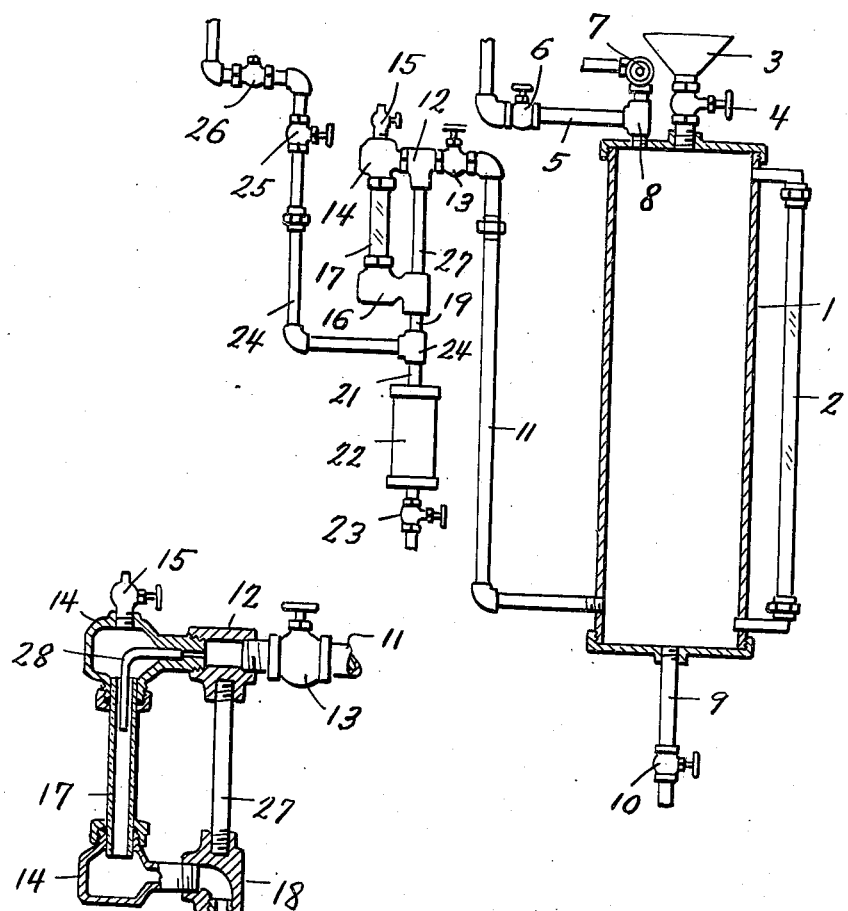
Fig. 1.
Fig. 2.
Inventor
Frank L. Overson
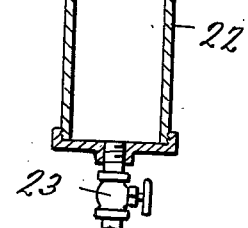
By Clarence A. O'Brien
and Hyman Berman
Attorneys Patented May 7, 1940

2,199,728

UNITED STATES PATENT OFFICE 2,199,728

SIGHT FEED CONTROL OF WATER SOFTENING TREATMENT FOR BOILERS

Frank L. Overson, Milwaukee, Wis.

Application May 18, 1938, Serial No. 208,730

1 Claim. (Cl. 210—38)

This invention relates to a sight feed control of water softening solution for the treatment of water in boilers, the general object of the invention being to provide means whereby an air pocket can be created in a gauge glass so that the drops of solution passing through the glass can be observed.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a diagrammatic view with parts in elevation and parts in section of the invention.

Figure 2 is an enlarged sectional view through the gauge glass and air charging chamber and the connections between the parts.

In this drawing the numeral 1 indicates the compound container provided with the sight gauge 2 and the chemicals are introduced into this chamber by means of the funnel 3 which is connected with the upper end of the container by means of a plug valve 4. A pipe line 5 connects the upper end of the container with a pressure water supply and this line contains a needle control valve 6. A vent valve 7 is connected with the coupling 8 which connects the line 5 with the container 1. A drain pipe 9 containing a drain valve 10 is connected with the bottom of the container. A pipe line 11 leads from the lower portion of the container 1 to a coupling 12 and contains a valve 13 and said coupling is connected with the upper gauge glass fitting 14 which has an air vent needle valve 15 at its upper end. The lower fitting is shown at 16 and the glass at 17. A coupling 18 connects the lower fitting 16 with a tube 19 the lower end of which is connected with a T-coupling 20 and a pipe 21 connects the lower end of the coupling 20 with the air charging chamber 22 which is provided with a drain cock 23 at its bottom. A pipe line 24 leads from the coupling 20 to the boiler feed system ahead of the boiler feed pump and this line contains the plug valve 25 and the ball check valve 26. A supporting rod or tube 27 connects the couplings 18 and 12 together and the inlet coupling 12 into the glass 17 is formed by a small copper tube 28 which is of angle shape and extends part way into the upper portion of the glass.

In using the invention the chemicals are placed through the funnel 3 into the container 1 by opening the valve 4 and the container and all the lines are filled with water. The valve 7 is opened, while the parts are being filled with water to permit air to escape from the container 1. Then valves 13 and 25 are closed and valves 15 and 23 are opened. This will drain water from the gauge glass 17 and the air charging chamber 22. Then valves 15 and 23 are closed and valve 25 completely opened. Then valve 13 is opened slowly and as water drops from the tube 28 through glass 17 and enters the air chamber 22 the air in the chamber will rise up in the gauge glass 17 to form an air pocket therein and then the device is ready for use. In using the device the valves 6 and 13 are opened and by properly controlling valve 6 the compound or solution is fed by drops through the air in the glass 17 and passes to the boiler. The drops falling through the glass 17 can be observed and thus one can ascertain just how many drops per minute are passing to the boiler.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

Means for supplying a softening solution to a boiler comprising a container for receiving softening material, means for connecting the container to a water supply, a sight gauge, a pipe line connecting the container to the upper end of the gauge for leading the water with the material therein from the container to the gauge, a valve in the pipe line for closing the supply of water to the gauge, a vent valve in the top of the gauge for venting air therefrom, a chamber forming member, a vertically arranged pipe line connecting the upper end of said chamber forming member with the bottom of the gauge, a pipe line connecting an intermediate part of the last-mentioned pipe line to the boiler, a valve in the last-mentioned pipe line for closing communication between the air chamber forming member and the boiler and a drain valve in the bottom of the chamber forming member.

FRANK L. OVERSON.